United States Patent [19]
Burchill et al.

[11] Patent Number: 5,110,625
[45] Date of Patent: * May 5, 1992

[54] PROCESS FOR SURFACE MODIFICATION OF POLYMER ARTICLES

[75] Inventors: Michael T. Burchill, Cranbury; Maryam Rafiei, Bayonne; Joseph Silbermann, Old Bridge, all of N.J.

[73] Assignee: Atochem North America, Philadelphia, Pa.

[*] Notice: The portion of the term of this patent subsequent to Sep. 19, 2006 has been disclaimed.

[21] Appl. No.: 613,946

[22] Filed: Nov. 13, 1990

Related U.S. Application Data

[63] Continuation of Ser. No. 322,286, Mar. 13, 1989, abandoned, which is a continuation of Ser. No. 209,619, Jun. 21, 1988, Pat. No. 4,868,011, which is a continuation-in-part of Ser. No. 945,595, Dec. 23, 1986, Pat. No. 4,770,905.

[51] Int. Cl.⁵ .............................................. B05D 5/00
[52] U.S. Cl. .................................. 427/160; 427/331; 427/336; 427/352; 427/353; 427/377; 427/430.1; 427/434.2
[58] Field of Search ............... 427/160, 331, 336, 352, 427/353, 377, 430.1, 434.2

[56] References Cited

U.S. PATENT DOCUMENTS

| | | | |
|---|---|---|---|
| 3,192,074 | 6/1965 | Newhard, Jr. | 148/6.14 |
| 3,309,220 | 3/1967 | Osteen | 117/33.3 |
| 3,519,462 | 7/1970 | Bristol et al. | 117/33.3 |
| 3,594,264 | 7/1971 | Urban | 161/168 |
| 3,617,330 | 11/1971 | Peilstocker | 427/160 |
| 3,892,889 | 7/1975 | Cohnen et al. | 427/160 |
| 4,126,660 | 11/1979 | Lampkowicz | 264/101 |
| 4,129,667 | 12/1978 | Lorenz et al. | 427/44 |
| 4,322,455 | 3/1982 | Olson et al. | 427/160 |
| 4,323,597 | 4/1982 | Olson | 427/160 |
| 4,349,602 | 9/1982 | Ching | 428/331 |
| 4,353,959 | 10/1982 | Olson et al. | 428/331 |
| 4,382,109 | 5/1983 | Olson et al. | 428/331 |
| 4,396,678 | 8/1983 | Olson | 428/412 |
| 4,439,494 | 3/1984 | Olson | 428/412 |
| 4,556,606 | 12/1985 | Olson | 428/412 |
| 4,636,408 | 1/1987 | Anthony et al. | 427/160 |
| 4,770,905 | 9/1988 | Silbermann et al. | 427/160 |

FOREIGN PATENT DOCUMENTS

| | | |
|---|---|---|
| 612206 | 1/1962 | Belgium. |
| 134523 | 3/1985 | European Pat. Off. |
| 151961 | 8/1985 | European Pat. Off. |
| 2808005 | 8/1979 | Fed. Rep. of Germany. |
| 2808036 | 8/1979 | Fed. Rep. of Germany. |

OTHER PUBLICATIONS

Katz et al., "Ultraviolet Protection of Transparent PVC by Diffusion Coating", Soc. Plast. Eng., Tech. Papers (1976), vol. 22, pp. 511-512.

*Primary Examiner*—Janyce Bell

[57] ABSTRACT

An improvement in the process of incorporating a modifier ingredient into the surface region of a resinous article is described herein. The basic process includes immersing the article in a liquid such as water and contacting the immersed article with a solution of a modifier ingredient in a solvent which is immiscible with the liquid. The improvement herein comprises removing a substantial amount of air dissolved in the water layer to prevent droplets of solution from rising to the surface of the water layer during the process, thereby preventing solid modifier material from accumulating on the water surface.

17 Claims, No Drawings

PROCESS FOR SURFACE MODIFICATION OF POLYMER ARTICLES

This is a continuation of application Ser. No. 322,296 filed Mar. 13, 1989, now abandoned which is a continuation of application Ser. No. 209,619, filed Jun. 21, 1988, now U.S. Pat. No. 4,868,071 which is a continuation-in-part application of Ser. No. 945,595, filed Dec. 23, 1986, now U.S. Pat. No. 4,770,905.

BACKGROUND OF INVENTION

1. Field of the Invention

This invention relates to surface modified resinous articles, and processes for making same, and more particularly, to an improved method for making said articles in a continuous manner.

2. Description of the Prior Art

In the aforesaid copending patent application, there is described a method of incorporating a modifier ingredient such as a UV absorber into the surface region of a resinous body such as a PVC sheet. The method includes the steps of: (1) immersing the body in a liquid such as water and (2) contacting the immersed body with a solution of the modifier ingredient in a solvent such as methylene chloride which is immiscible with the liquid and which will swell the surface of the resin to allow the solution to enter its surface region.

In the continuous mode of practicing this process, the solution is present as a lower layer, water is the upper layer, a continuous polymer sheet article is transported through the water, and the solution is pumped from the lower layer to the upper layer and directed onto the top surface of the sheet for a predetermined contact time during which the modifier ingredient is incorporated into the contacted surface. After the solution is applied, a jet of water is directed onto the treated surface to displace any residual solution remaining thereon.

When this process is run for an extended period at room temperature, however, it is observed that a solid precipitate of UV stabilizer material accumulates on the surface of the water layer. This solid material circulates through the system and tends to clog the pumping and piping equipment used both for applying the solution to the resin surface and for displacing residual solution thereon.

While suitable filters and/or skimmers may be used in the system to remove solid material floating on the surface of the water layer, such techniques require relatively costly equipment and periodic maintenance.

Accordingly, it is an object of the present invention to provide a method for preventing solid modifier material from appearing and collecting on the surface of the water layer in the resin surface modification process of the aforesaid patent application.

A more particular object herein is to provide a physical method of substantially eliminating the problem of solid formation on the surface of the water layer in such process.

A feature of the invention is the provision of a deaeration step in the said process to physically remove dissolved air from the water layer.

These and other objects and features of the invention will be made apparent from the following more particular description thereof.

SUMMARY OF THE INVENTION

An improvement in the process of incorporating a modifier ingredient into the surface region of a resinous article is described herein. The basic process includes immersing the article in a liquid such as water and contacting the immersed article with a solution of a modifier ingredient in a solvent which is immiscible with the liquid The improvement herein comprises removing a substantial amount of air dissolved in the water layer to prevent droplets of solution from rising to the surface of the water layer during the process, thereby preventing solid modifier material from accumulating on the water surface.

DETAILED DESCRIPTION OF THE INVENTION

It has been discovered that air dissolved in the water layer is instrumental in enabling droplets of modifier solution to reach the surface of the water layer. Accordingly, several methods are provided herein for removing a substantial amount of air dissolved in the water layer used in the two-phase surface modification process. These techniques include: (1) boiling the water to remove dissolved air, followed by cooling; (2) deaerating the water by applying a vacuum over the water; and (3) subjecting the water to sonic energy. Other deaeration techniques for effecting the desired result will become apparent to those skilled in the art and may be employed as alternative to those described above.

The invention will be illustrated by reference to the following examples.

EXAMPLE 1

In a laboratory experiment which illustrates the principle of the invention, 500 g of a solution of 200 g of solid ultraviolet light stabilizer, e.g. Cyasorb UV 5411 (Trademark of American Cyanamid Co.) dissolved in 800 g of methylene chloride, was added to a 4 l bell jar and covered with a 3 l blanket of tap water at 25° C. A peristaltic pump was used to pump the solution from the lower solution layer to and through the upper water layer. Pumping of solution was continued for 90 minutes. Solid stabilizer was observed to precipitate on the surface of the water; it was collected, dried and weighed. 2.5 g of solid material was obtained.

EXAMPLE 2

The procedure above was followed except that the tap water was boiled for 10 minutes and then cooled to room temperature. Only 0.1 g of solid material was collected after 90 minutes.

EXAMPLE 3

500 ml of water was deaerated for 20 minutes in a vacuum desicator by pulling 60 torr of vacuum. The deaeration step was repeated to make 3500 ml of deaerated water, which was then cooled to 17° C. A solution of 20% wt/vol of Cyasorb 5411 in methylene chloride was pumped through the upper water layer and back to the lower solution phase for a period of 90 minutes. The apparatus was uncovered during this period. Only 0.006 g of precipitate was formed on the surface of the water.

These results show that deaeration of the water layer is a particularly effective method for substantially eliminating the problem of formation of solid material on the surface of the water layer during the underwater impregnation process.

While the invention has been described with particular reference to certain embodiments thereof, it will be understood that changes and modifications may be made which are within the skill of the art. Accordingly, it is intended to be bound only by the claims which follow.

What is claimed is:

1. A method modifying the surface characteristics of a resinous article, comprising:
   a. immersing an article in water,
   b. contacting the immersed article with a solvent solution of methylene chloride having a modifier ingredient therein, and
   c. concurrently subjecting said liquid to a deaeration process.

2. A method according to claim 1, wherein said deaeration process comprises boiling and then subsequently cooling said water.

3. A method according to claim 1, wherein said deaeration process comprises subjecting said liquid to vacuum conditions.

4. A method according to claim 1, wherein said deaeration process comprises subjecting said liquid to sonic energy.

5. A method according to claim 11, wherein said modifier ingredient is a solid ultraviolet light stabilizer.

6. A method according to claim 1, wherein said deaeration process removes an amount of air dissolved in said liquid sufficient to prevent any appreciable number of droplets of said solvent solution from rising through said liquid to the surface of said liquid.

7. A method of modifying the surface characteristics of a resinous article, comprising:
   (a) immersing an article in water,
   (b) contacting the immersed article with a solvent solution having a modifier ingredient therein, which is substantially immiscible with water, and
   (c) concurrently subjecting said water to a deaeration process.

8. The method of claim 7, wherein said deaeration process comprises subjecting said water to vacuum conditions.

9. The method of claim 7, wherein said deaeration process comprises boiling and then subsequently cooling said water.

10. The method of claim 7, wherein said deaeration process comprises subjecting said water to sonic energy.

11. A method according to claim 7, wherein said modifier ingredient is a solid ultraviolet light stabilizer.

12. A method according to claim 7, wherein said solvent is methylene chloride.

13. A method according to claim 7, wherein said deaeration process removes an amount of air dissolved in said water sufficient to prevent any appreciable number of droplets of said solvent solution from rising through said water to the surface of said water.

14. A method of incorporating an ultraviolet light stabilizer into the surface region of a resinous article, comprising:
   (a) immersing said article in water,
   (b) contacting the immersed article with a solvent solution of methylene chloride having an ultraviolet light stabilizer therein, and
   (c) concurrently subjecting said water to a deaeration process, thereby removing an amount of air dissolved in said water sufficient to prevent any appreciable number of droplets of said solvent solution from rising through said water to the surface of said water.

15. The method of claim 14 wherein said deaeration process comprises subjecting said water to vacuum conditions.

16. The method of claim 14 wherein said deaeration process comprises boiling and the subsequently cooling said water.

17. The method of claim 14, wherein said deaeration process comprises subjecting said water to sonic energy.

* * * * *